358-84. OR 3,157,737 SR

SEARCH ROOM

Nov. 17, 1964 H. J. SCHLAFLY, JR 3,157,737

SUBSCRIPTION TELEVISION DISTRIBUTION SYSTEM WITH RECORDING MEANS AT THE RECEIVER

Filed June 20, 1960 3 Sheets-Sheet 1

T5027
Rh

INVENTOR
Hubert J. Schlafly, Jr.
BY
Pennie Edmonds Morton Barrows & Taylor
ATTORNEYS INVENTOR
Hubert J. Schlafly, Jr.
BY
Pennie Edmonds Morton Barrows & Taylor
ATTORNEYS INVENTOR
Hubert J. Schlafly, Jr.
BY
Pennie Edmonds Morton Barrows & Taylor
ATTORNEYS 3,157,737
Patented Nov. 17, 1964

3,157,737

SUBSCRIPTION TELEVISION DISTRIBUTION SYSTEM WITH RECORDING MEANS AT THE RECEIVER

Hubert J. Schlafly, Jr., Hollis, N.Y., assignor to Teleprompter Corporation, New York, N.Y., a corporation of New York Filed June 20, 1960, Ser. No. 37,251
4 Claims. (Cl. 178—6)

This invention relates to signal distribution, and more particularly to the distribution of signals such as television signals over a network of transmission lines extending from a central control station to a plurality of subscriber's stations. The invention provides a signal distribution system which permits control and recording of the reception by individual subscribers of the signals distributed, and which permits participation by the subscribers in a program to which the distributed signals belong. It also provides means by which the number of subscribers electing to receive a program may be estimated, and means by which there may be estimated the number of subscribers actually participating in a particular phase of the program.

The invention will now be described in further detail with reference to the accompanying drawings in which FIG. 1 is a diagram, partly schematic and partly in block form, of one embodiment of the invention;

Figure 1:
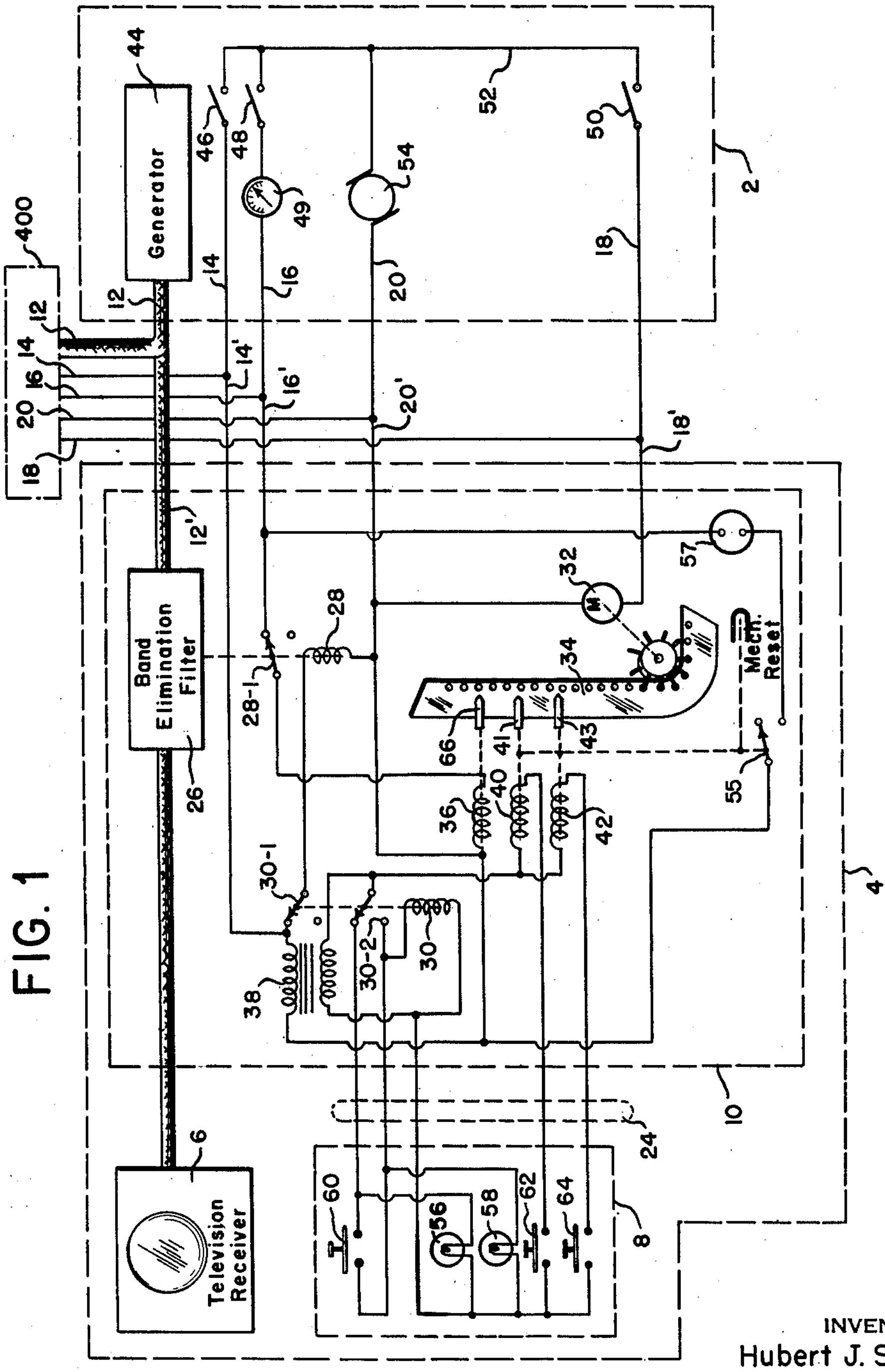

In FIG. 1 an installation according to the invention is shown as comprising a central station indicated at the dash line box 2 and a subscriber's station indicated at the dash line box 4. Typically there will be a large number of subscriber's stations for each central station, the subscriber's stations being connected to the central station in parallel. The subscriber's station includes, in addition to a television receiver 6, which may be of normal construction and which need not be altered in any way, a viewer's control unit indicated at the dash line box 8 and a subscriber's channel elimination and recording unit indicated at dash line box 10. A transmission line 12 such as a coaxial cable supplies complete television signals to the subscriber's stations, each of which connects to the line 12 at a branch line 12'. Lines 12 and 12' are adapted to transmit a complete television signal, i.e. a radio frequency carrier modulated with video, synchronizing and sound signals, and may indeed be designed to carry simultaneously a plurality of such complete television signals in separate frequency channels. The central station is additionally connected to each of the subscriber's stations by a plurality of control conductors. In the embodiment of FIG. 1 four conductors 14, 16, 18 and 20 are shown, connected at branch conductors 14', 16', 18' and 20' into the subscriber's station 4. Line 12 and conductors 14, 16, 18 and 20 are shown extending beyond their branches 12', 14', 16', 18' and 20' for connection via similar branches into other subscriber's stations. One such station is shown at the box 400, which may be identical with the subscriber's station shown at dash line box 4.

The viewer's control 8 is conveniently embodied in a compact container to be disposed at will on the subscriber's premises, typically in the same room as the television receiver 6. The subscriber's channel elimination and recording unit 10, on the other hand, while also housed in a unitary enclosure, is preferably disposed inaccessibly to the subscriber, as for example in a casing supported on a utility pole outside the subscriber's house or elsewhere where access to it can be had by an employee performing a function similar to that of the meter reader for a public utility supplying electric power.

Figure 4:
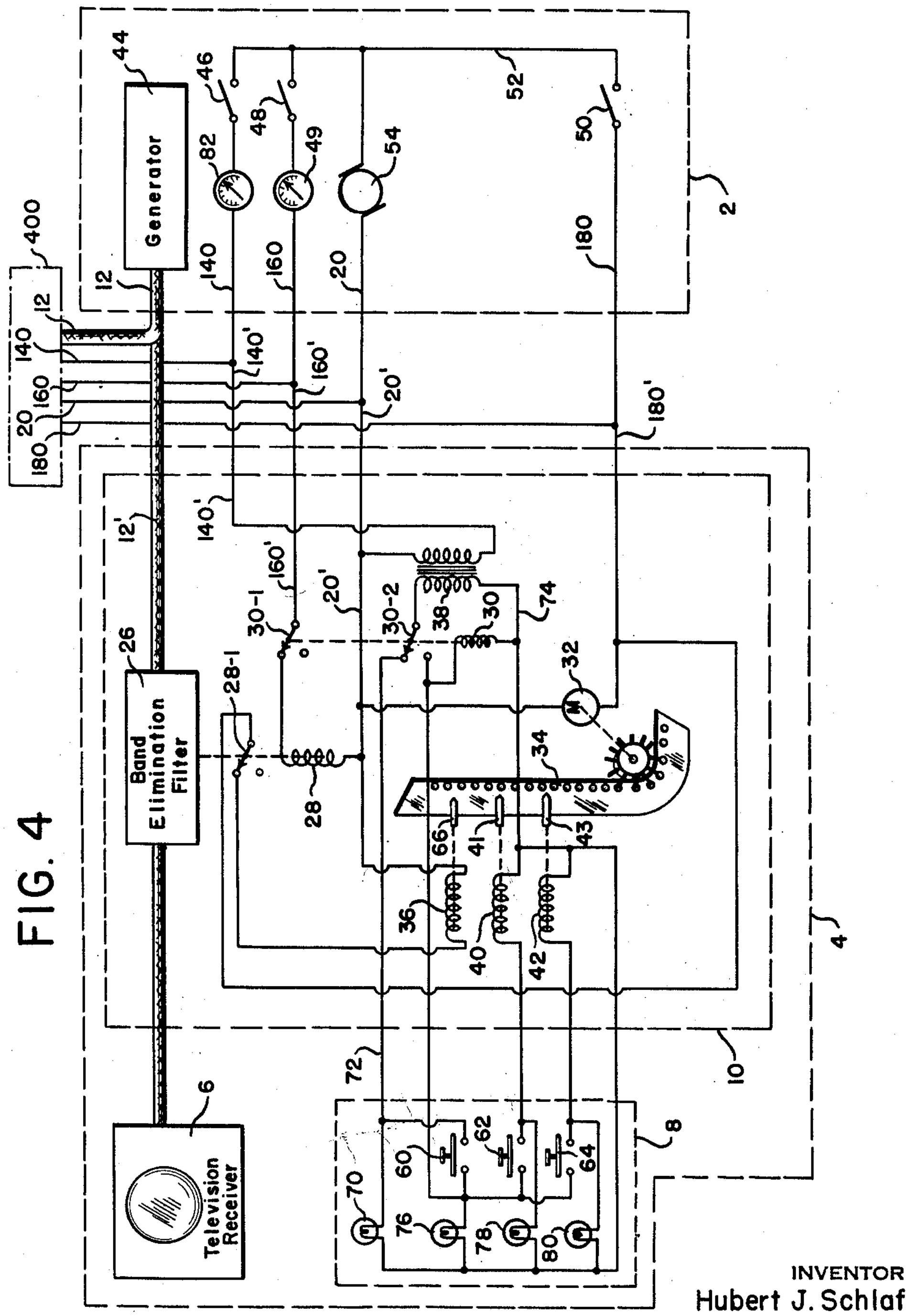
FIG. 4 is a diagram similar to that of FIG. 1 but showing a modified embodiment of the invention.

The branch video transmission line 12' passes through the recording unit 10, and the viewer's control unit 8 is connected to the recording unit 10 by means of a plurality of conductors conveniently formed into a cable as indicated at 24. In the embodiments of FIGS. 1 and 4 five conductors are provided to connect the viewer's control 8 with the channel elimination and recording unit 10. Conductors 14, 16, 18 and 20 may of course likewise be cabled, and so may conductors 14', 16', 18' and 20'.

Figure 2:
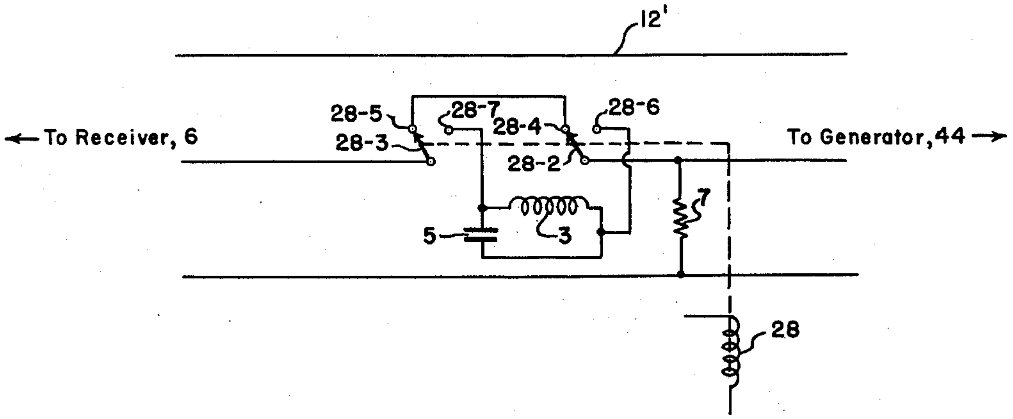
FIG. 2 is a schematic diagram of one component shown in block form in FIG. 1.

The recording unit 10 includes a band elimination filter unit 26, shown in further detail in FIG. 2. This unit contains an electrical network together with switching contacts by means of which the network may be effectively inserted into the transmission line 12' or eliminated therefrom. When so inserted the network introduces into line 12' a large attenuation of the order of 40 db within one television frequency channel, effectively preventing reception on that channel at receiver 6 while permitting the receiver to display programs on other channels.

One form of construction for the filter unit is shown diagrammatically in FIG. 2. It comprises a section of the coaxial line 12' in which the center conductor is interrupted, connecting on opposite sides of the interruption to the movable contacts 28–2 and 28–3 of a relay 28 (FIG. 1). The contacts 28–4 and 28–5 with which contacts 28–2 and 28–3 engage when the relay is de-energized are short circuited together. The normally open contact 28–6 associated with contact 28–2 adjacent the central station leads through an inductor 3 and capacitor 5 to the inner conductor of the line 12' via the other normally open contact 28–7, the inductor and capacitor being in parallel. A resistor 7 may be connected across the line 12'.

With the relay de-energized the line 12' is substantially electrically continuous through the filter unit 26, whereas with the relay energized the line transmits poorly over a selected band of frequencies determined by the values of the elements 3 and 5.

Other forms of selectively insertable and removable band elimination filters can of course be used in place of that of FIG. 2.

In accordance with the invention the band elimination filters 26 of all subscribers are arranged to be energizable from the control station in order to block the reception of selected program material except to the extent that the subscribers, by operation of their viewer's control units 8, effectively remove their respective filters from their respective transmission lines 12'. In so doing the subscribers record their action and may thus be made to commit themselves to pay for the program thus made available to them.

The subscriber's recording unit 10 (FIG. 1) includes to this end a band elimination filter control relay 28, a subscriber's acceptance relay 30 and a recording device in which a motor 32 drives a record medium, shown as a tape 34. In addition the unit 10 includes a program recording solenoid 36, a transformer 38 and, in the embodiment of FIG. 1, two participation recording solenoids 40 and 42.

At the central station the transmission line 12 is fed from a television signal generator 44. The generator 44 may include apparatus for suitable amplification of television signals received from remote points over transmission lines. It may also include means to generate television signals from any suitable record means, for example motion picture film or video tape. In addition the central station includes switches 46, 48 and 50 by means of which the conductors 14, 16 and 18 can be separately connected to a source of power indicated as a bus 52 connected to a power circuit, symbolically indicated as a generator 54 whose other terminal is connected to the conductor 20. In practice the source of power 54 may be simply a 110 volt 60 cycle circuit.

In the viewer's control unit 8 there are provided in the embodiment of FIG. 1 two indicator lights 56 and 58 and three switches 60, 62 and 64. These switches are shown as push-button switches spring-loaded to open position. Switch 60 functions when operated to connect the subscriber's receiver 6 effectively to the transmission line 12 for all channels, notwithstanding activation by the central station 2 of the filter 26. Switches 62 and 64, which may be called participation switches, function to operate the recording solenoids 40 and 42 in a manner also to be further described hereinafter.

At the central station 2 a current measuring device 49 is inserted in series with the control conductor 16 and provides a measure of the number of subscribers who have operated their switches 60 in the course of a participation program. In this way a direct measure of the audience is available.

It is contemplated that in the operation of the invention the filters 26 may be deactivated a substantial and perhaps a major fraction of the time, permitting reception by the subscribers of all programs delivered to line 12 without operation by them of their view's control units 8. Certain program material, called subscription material, will however be made available to the subscribers only on the condition that each subscriber desiring to receive it signify his desire by closing his switch 60. During the application of such program material to the transmission line 12 the system conductor 14 is energized, thereby energizing in all of the recording units 10 the filter control relay 28 and thereby inserting the band elimination filter into each of lines 12'. Operation by a subscriber of his "acceptance" switch 60 serves to deenergize the relay 28 and consequently to remove the filter 26 from his transmission line 12'.

The transformer 38 provides low voltage for the control circuits brought into the subscriber's house through the cable 24.

When it is desired to transmit a program on the subscription basis the central station first energizes conductor 16 by closing switch 48. This operation energizes the program record solenoid 36 in each recording unit 10 and thereby produces in each a record mark on the tape 34. Solenoid 36 when energized actuates a recording stylus 66 against the tape. This mark may be used to identify the beginning of the program upon subsequent analysis of the tapes for statistical or billing purposes. At the same time a reading of the current meter 49 may be made to provide a calibration by comparison with which the fraction of the subscriber's stations which have operated their switches 60 during the subsequent subscription program can be estimated.

Switch 46 is thereupon closed. This energizes the transformer 38 at each subscriber's conductor 14'. It also energizes relay 28, thereby effectively inserting the filter of unit 26 into each subscriber's transmission line 12' and blocking reception on the receivers 6 of program material on the channel of the filter so inserted, as above described in connection with FIG. 2. Energization of the relay 28 moreover breaks the circuit for the program recording solenoid 36, conductor 16 passing through a normally closed contact 28–1 on relay 28. The indication on current meter 49 at the central accordingly falls to zero.

The energization of transformer 38 from conductor 14 provides voltage to the circuits of the participation solenoids 40 and 42 which accordingly will be energized upon operation of the switches 62 and 64 respectively. In addition, in the embodiment of FIG. 1 the indicator lamp 56 is illuminated in order to advise the subscriber that subscription material is about to be made available to him on condition that he operate his acceptance switch 60.

At the central station the switch 50 is now closed, energizing conductor 18 and consequently setting into motion the drive motor 32 for the tape 34. The motor 32 is advantageously of the synchronous type so as to provide at all control units a uniform speed of advance for the record tape 34. A low speed of the order of one quarter of an inch per minute for the tape is sufficient, and the tape need not be driven throughout the subscription program.

A subscriber who now closes his switch 60 thereby energizes his acceptance relay 30. This operation breaks the circuit for relay 28 at normally closed contacts 30–1. The filter 26 in his control unit 10 is thereby removed from his transmission line 12' and all channels on that line are effectively connected through to his receiver 6. By deenergization of relay 28 the circuit for solenoid 36 is reestablished at relay contacts 28–1. Energization of solenoid 36 so effected produces another mark on the record tape which later serves billing and statistical purposes when the tape 34 is collected by the "meter reader." Each recording solenoid 36 so re-energized draws some current from the conductor 16, and the growth in current indicated at meter 49 thereby provides to the central station an indication of the size of the audience.

Energizaiton of relay 30 produces at relay contacts 30–2 a holding circuit for that relay and consequently a steady illumination of the indicator lamp 58, indicating to the householder that a subscription program is available at his receiver 6.

The beginning of the transmission of the participation program by operation of the signal generator 44 may be timed to precede or follow the operations already described.

Figure 3:
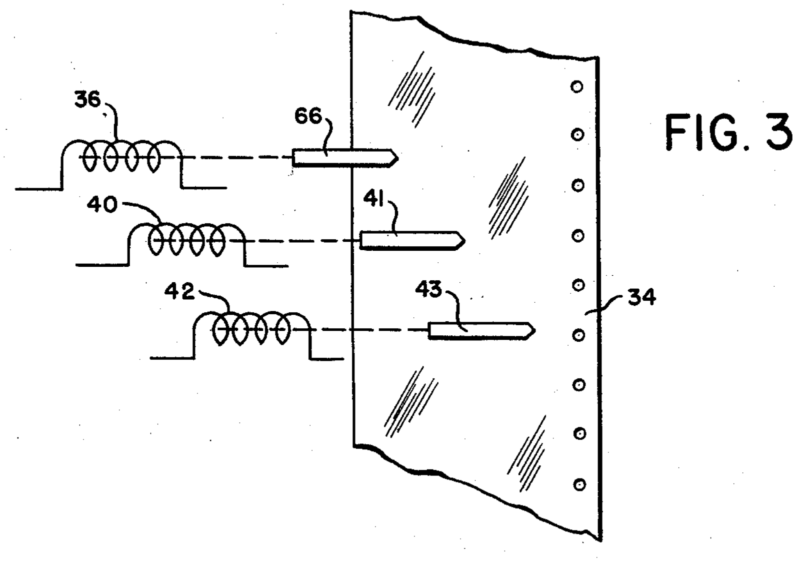
FIG. 3 is a detailed view of the recording apparatus in the embodiment of FIG. 1.

Switches 62 and 64 provide means whereby the subscriber may, upon invitation over the television channel, energize solenoids 40 and 42 for the making of record marks on tape 34, the solenoids being coupled to recording styli 41 and 43 respectively. As indicated in FIG. 3 the styli 66, 41 and 43 may be arranged with respect to the tape in order to make their record marks in positions laterally displaced crosswise of the tape.

Switches 62 and 64 may be employed for quizzes, in programs of educational television, or they may be employed in merchandising schemes, the subscriber being invited to enter an order for an article of merchandise by operating the appropraite one or combination of these switches in a time interval specified to him on the television program.

Periodically a meter reader visits the recording units 10 and removes therefrom a portion of the tape 34, which may bear an identification of the subscriber or which identification together with an indication of the date and hour of collection may be applied to the piece of tape so torn off by the meter reader. If desired, a switch 55 may be provided, connected in series with a lamp 57 between conductors 16' and 20', and coupled mechanically to the plungers of solenoids 40 and 42 so that the switch 55 will be closed (and then remain closed) only upon operation of one or both of those solenoids. The lamp 57 may be placed in position to be observed by the "meter reader," who will be advised thereby if the subscriber has since the last "reading" of the recording unit made any use of the participation switches. This may be useful if it is desired to gather at the recording units 10 data on individual subscriber participation more often than data on acceptance of programs for which a charge may be made, as for billing purposes. Unless the lamp is lighted, the data collector ignores the record unit.

The advance of the tape or of the record medium is controllable from the central station at switch 50 and need not be continuous. The record medium may be advanced in a plurality of steps, one for each of the opportunities afforded the subscriber for the recording of an answer, of a preference or of an order at the participation switches 62 and 64. An advance is also required for each distinct program, separately to be charged for or otherwise recorded in response to the subscriber's operation of his switch 60. For each such program it is desirable that the record medium be subjected to an advance toward the end of the program in order that a distinct record be made, distinct from that marking the beginning of the program, for subscribers who after the beginning of the program indicated their desire to subscribe by operating their switches 60.

The record tape 34 is illustrated in FIG. 3, where the styli 66, 41 and 43 of the solenoids 36, 40 and 42 are seen to engage it at distinct locations transversely of the tape. Acceptance of a program is recorded by stylus 66 in the making of a mark at a point along the length of the tape subsequent to the mark made by stylus 66 in all recording units when conductor 16 is energized at the central station. Styli 41 and 43 record choices or responses made by operation of the switches 62 and 64, and may be interpreted in terms of their positions lengthwise of the tape by reference to a record of the times at which the program in question invited responses or choices.

In the embodiment of FIG. 4 the subscriber may be advised of a forthcoming subscription or participation program, by the lighting of a lamp 70 in the viewer's control 8, before the channel carrying the participation program is closed in his transmission line 12' by energizing of relay 28. If the subscriber is interested, he may tune his receiver 6 to this channel, and the central station may supply over this channel a fragment of the forthcoming program, or other inducement to the subscribers to accept the program. To this end the transformer 38 has its primary connected between conductor 20' and a conductor 140', which takes the place of the conductor 14' of FIG. 1. A conductor 160', which takes the place of conductor 16' of FIG. 1 is provided for energization of the filter control relay 28, via normally closed contacts 30–1 of the subscriber's relay 30. A conductor 180', which takes the place of conductor 18' of FIG. 1, controls energization of the tape drive motor 32 and it also supplies the movable contact 28–1 on relay 28 through which, when relay 28 is de-energized, the program acceptance recording solenoid 36 is energized.

The warning lamp 70 in the viewer's control is connected between a conductor 74 on one side of the secondary of transformer 38 and a conductor 72 which connects with the opposite end of that secondary through a normally closed contact 30–2 on the subscriber's relay 30. When the accept switch 60 is now closed, relay 30 is energized, lamp 70 is extinguished and a lamp 76 is lighted, to signify that the subscriber has access to the participation channel controlled by filter 26. Lamps 78 and 80 may further be provided to signalize the operation of participation switches 62 and 64.

With the circuit of FIG. 4, the control station may initiate a participation or "paying" program by energizing conductor 180. This energizes the accept recorder solenoid 36 and tape drive motor 32 at all subscriber's stations. In this way there will be recorded on the tape at all stations the beginning of a program (which individual subscribers may or may not elect to accept). Moreover, by repeated operation of switch 50 a series of marks may be recorded, identifying the forthcoming program according to a code. If next conductor 140 is energized, the lamps 70 will be lighted, and the central station may provide over the participation channel with which filters 26 are designed to interfere, announcement of the program.

Thereafter the central station may close switch 48, energizing the relays 28 and thereby requiring the subscribers to operate their acceptance switches 60 if they desire to receive the program on the participation channel.

In the embodiment of FIG. 4 the meter 49 in series with conductor 160 will give a maximum current indication when all of the relays 28 are energized, i.e. when the participation channel is blocked for all subscribers. Its reading will decline as more and more subscribers de-energize the relay 28 in their recording unit, and in this way a measure of the audience for any participation program may be obtained. In addition, a meter 82 in series with conductor 140 will give during the program an instantaneous estimate of the number of persons actually observing the program and operating their participation switches 62 and 64. In this way it is possible, for example, to determine at any instant during a participation or subscription program not only what proportion of the subscriber's stations have made the program available, but in what proportion of those stations there are persons actually present and sufficiently interested in the program to operate the switches 62 and 64 when requested to do so via the program.

Operation of the subscriber's acceptance switch 60 and, if desired, of his participation switches 62 and 64, may advantageously be protected by lock and key built into the viewer control unit 8 to protect the subscriber from unauthorized use thereof.

While the invention has been described herein in terms of a number of preferred embodiments it is not limited thereto. For example, the participation switches 62 and 64 and their solenoids 40 and 42 may be reduced in number or eliminated, with a consequent reduction in the number of conductors required between the viewer control 8 and the recording unit 10. The number of conductors required between the central station and recording units may also be decreased, with consequent reduction in performance. For example, a single two wire circuit might be employed to energize the transformer 38, and motor 32 and to energize the relay 28 subject to disablement by the subscriber, as in the embodiments illustrated.

On the other hand, the system may be made more elaborate than are the embodiments which have been shown, for example by the provision of plural band elimination filters for each subscriber, operating on plural frequency channels in the transmission line 12'. The invention itself, in its various aspects, is set forth in the appended claims.

I claim:

1. A signal distribution system comprising a central station and a plurality of subscriber's stations, a source of intelligence signals at the central station, a signal reproducing device at each subscriber's station, a first transmission line connected to said signal source, a separate branch transmission line connecting each of said subscriber's stations with said first transmission line, separate signal blocking means removably insertable into each of said branch lines, separate electrical means for each subscriber's station operable in one of two states of energization to insert said blocking means, means operable from the central station to condition said separate electrical means to the state of energization in which said blocking means are inserted, means at each subscriber's station selectively operable to cancel at such subscriber's station the operation of said conditioning means, record medium means advanceable under control of the central station, separate participation switch means at each subscriber's station, and means to record for each individual subscriber's station the operation of said cancelling means and said participation switch means on said record medium means.

2. A signal distribution system comprising a central station and a plurality of subscriber's stations, a source of intelligence signals at the central station, a signal reproducing device at each subscriber's station, a first transmission line connected to said signal source, a separate branch transmission line connecting each of said subscriber's stations with said first transmission line, separate signal blocking means removably insertable into each of said branch lines, separate electrical means for each subscriber's station operable in one of two states of energization to insert said blocking means, separate control means at each of said subscriber's stations for control of the inserting means at such station between said two states, said inserting means being energizable from a first common circuit at said central station, a second common circuit including parallel branches one at each of said subscriber's stations, a switch in each of said last-named parallel branches, means to measure at the central station the sum of the loads connected across the branches of said second common circuit, and means to record separately for each subscriber's station the condition of said control means upon energization of said first common circuit and the condition of each said switch in said parallel branches.

3. A signal distribution system comprising a central station and a plurality of subscriber's station, a multiband source of intelligence signals at the central station, a signal reproducing device at each subscriber's station, a first transmission line connected to said multiband signal source, a separate branch transmission line connecting each of said subscriber's stations with said first transmission line, separate band elimination filters removably insertable into each of said branch lines, separate switch means for each subscriber's station, each switch means operable in a first of two states of energization to insert one of said band elimination filters into one of said branch lines and operable in the second of said two states of energization to directly couple, via said first transmission line and one of said branch transmission lines, one of said subscriber's stations to the central station, switch actuating means operable from the central station to condition said separate switch means to said first state of energization, selectively operable means at each subscriber's station associated with the separate switch means at the subscriber's station to return the associated separate switch means to said second state of energization, separate participation switch means at each subscriber's station for response by the subscriber to inquiries sent from the central station, and means to record in time sequence for each subscriber's station the condition of said selectively operable means and the condition of said participation switch means.

4. A signal distribution system comprising a central station and a plurality of subscriber's stations, a multiband source of intelligence signals at the central station, a signal reproducing device at each subscriber's station, a first transmission line connected to said multiband signal source, a separate branch transmission line connecting each of said subscriber's stations with said first transmission line, separate band elimination filters removably insertable into each of said branch lines, separate first switch means for each subscriber's station, each first switch means being operable in a first of two states of energization to insert one of said band elimination filters into one of said branch lines and operable in the second of said two states of energization to directly couple, via said first transmission line and one of said branch lines, one of said subscriber's stations to the central station, switch actuating means operable from the central station to condition said first switch means to said first state of energization, selectively operable means at each subscriber's station associated with the first switch means at the subscriber's station to return the associated first switch means to said second state of energization, separate participation switch means at each subscriber's station, common circuit means for coupling all of said separate participation switch means in parallel to said central station, means at the central station to provide an instantaneous indication of the number of said participation switch means which are in a given operative state, record medium means at each subscriber's station advanceable under control of the central station, and means to record operation of each said selectively operable means and each said participation switch means on their associated record medium means.

References Cited in the file of this patent

UNITED STATES PATENTS

| | | |
|---|---|---|
| 2,570,209 | Cotsworth | Oct. 9, 1951 |
| 2,607,846 | Hubbard | Aug. 19, 1952 |
| 2,854,506 | Pickles | Sept. 30, 1958 |
| 2,996,580 | Reid | Aug. 15, 1961 |
| 3,021,383 | Mountjoy | Feb. 13, 1962 |
| 3,041,389 | Court | June 26, 1962 |
| 3,051,775 | Novak | Aug. 28, 1962 |
| 3,071,642 | Mountjoy | Jan. 1, 1963 |